M. E. BAILEY.
NUT AND BOLT LOCK.
APPLICATION FILED JUNE 22, 1917.

1,275,359.

Patented Aug. 13, 1918.

Inventor
M. E. BAILEY

By H. S. Kie
Attorney

UNITED STATES PATENT OFFICE.

MYRL E. BAILEY, OF KANE, PENNSYLVANIA.

NUT AND BOLT LOCK.

1,275,359.  Specification of Letters Patent.  Patented Aug. 13, 1918.

Application filed June 22, 1917. Serial No. 176,331.

*To all whom it may concern:*

Be it known that I, MYRL E. BAILEY, a citizen of the United States, residing at Kane, in the county of McKean, State of Pennsylvania, have invented a new and useful Nut and Bolt Lock; and I do hereby declare the following to be a full, clear, and exact description of the invention, such as will enable others skilled in the art to which it appertains to make and use the same.

The present invention relates to certain new and useful improvements in nut locks, and has for its object to provide a device of this character which embodies novel features of construction whereby the nut may be securely locked against rotation upon the bolt, thereby enabling the bolt to be used upon structures which are subjected to constant vibration, without danger of the nut working loose.

Further objects of the invention are to provide a nut lock which is comparatively simple and inexpensive in its construction, which can be used repeatedly, which does not prevent the proper tightening of the nut when applying it to the bolt, and which will operate in a most effective manner to prevent the nut from working loose after it has once been applied to the bolt.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
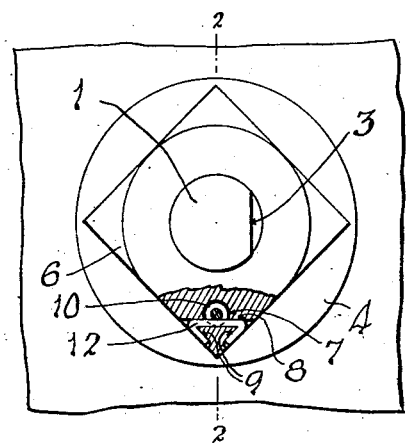
Figure 1 is a top plan view of a nut lock constructed in accordance with the invention, portions being broken away and shown in section to more clearly illustrate the details of construction.
Figure 2:
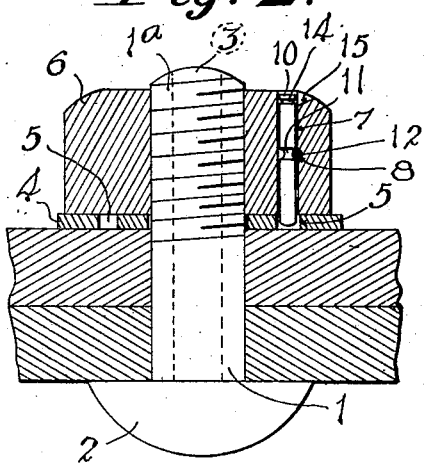
Fig. 2 is a vertical transverse sectional view taken on the line 2—2 of Fig. 1.
Figure 3:
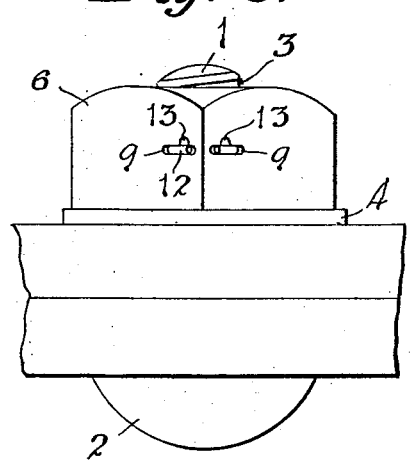
Fig. 3 is a side elevation thereof.
Figure 4:
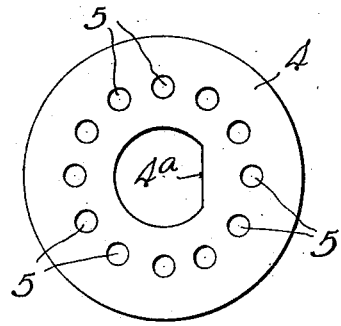
Fig. 4 is a top plan view of the washer.

Referring to the drawings, the numeral 1 designates a bolt which has one end thereof threaded in the usual manner at $1^a$, while the opposite end thereof is provided with the usual head 2. A flat side 3 extends the full length of the bolt 1, and a washer member 4 which is fitted slidably upon the bolt has a flat side $4^a$ at one side of the central opening therein for coöperation with the flat side 3 of the bolt to prevent rotation of the washer member upon the bolt. It will be obvious that with this construction the washer member is slidable longitudinally upon the bolt and can be moved in and out thereon, although it is locked securely against rotation upon the bolt. This washer member is formed with an annular series of openings 5 which extends around the central opening thereof.

A nut 6, preferably of a polygonal formation, is adapted to be screwed upon the threaded end $1^a$ of the bolt for coöperation in the usual manner with the head and shank of the bolt to fasten two or more members together. Extending longitudinally through one of the corner portions of the nut 6 is an opening 7 which is parallel to the axis of the nut and properly spaced therefrom to be brought successively into registry with the various openings 5 of the washer member as the nut is rotated upon the bolt. A smaller transverse opening 8 extends diagonally through one of the corners of the nut and intersects the longitudinal opening 7 tangentially, short grooves 9 being formed in the sides of the nut at the ends of the transverse opening 8. A locking plunger 10 is fitted in the opening 7 of the nut, the inner end of the said plunger being adapted to be projected into engagement with any selected one of the openings 5 of the washer member to lock the nut against rotation. When the locking plunger 10 is thus moved inwardly into operative position a grooved portion 11 at an intermediate point in the length thereof is adapted to be engaged by a retaining pin 12 inserted through the transversely and diagonally disposed opening 8. The extremities of this retaining pin 12 project from the ends of the opening 8 and are adapted to be bent into the before mentioned grooves 9 for the purpose of holding the retaining pin in position and preventing accidental loss or displacement thereof. These returned ends of the retaining pin 12 also serve as handles or finger pieces for inserting the pin in and removing it from the opening 8, and the short grooves 9 provide protection therefor to prevent them from being broken off or catching in adjacent objects. Small depressed seats 13 are shown as provided at the sides of the grooves 9 so that the end of a suitable tool can be brought into engagement with either one of the returned ends of the retaining pin 12 when it is desired to straighten the end of the pin for the purpose of removing the same and unlocking the nut. The outer end of the locking plunger 10 may be provided with a side recess 14 which is exposed at one side of a depressed seat 15 formed in the front of the nut 6 adjacent the outer end of the opening 7. This recess 14 of the locking plunger 10 can be engaged by an end of the retaining pin 12 for the purpose of forcibly prying the locking pin from position if it should become wedged or stuck.

Figure 5:
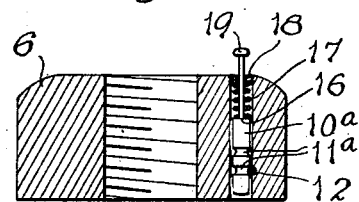
Fig. 5 is a vertical sectional view through a nut embodying a modified form of the invention.

A slight modification is shown by Fig. 5, in which the locking plunger 10ᵃ is formed with a pair of spaced grooved portions 11ᵃ, and also with an outwardly facing shoulder 16 which is engaged by a spring 17, said spring normally tending to move the plunger into operative position. This spring is shown as surrounding the plunger and interposed between the shoulder 16 and a guide ring 18 screwed into the outer end of the opening 7. The retaining pin 12 is contracted exactly as in the previous instance, being designed to engage either one of the grooved portions 11ᵃ of the locking plunger for the purpose of holding the locking plunger in either an operative or inoperative position. When screwing the nut into or out of position upon the bolt, the plunger 10ᵃ can be retracted by pulling outwardly upon a finger piece 19 at the end thereof, and then locked in a retracted position by causing the retaining pin 12 to engage the proper one of the grooves 11ᵃ. After the nut has been screwed into the desired position upon the bolt, the plunger 10ᵃ is released and permitted to engage one of the openings 5 of the washer member 4, and locked in an operative position by bringing the retaining pin 12 into engagement with the other one of the grooved portions 11ᵃ of the plunger.

Having thus described the invention, what I claim as new and desire to secure by Letters Patent, is:—

1. The combination with a bolt having a flat side, a washer fitted slidably upon the bolt and having a flat side for coöperation with the flat side of the bolt to hold the washer against rotation, said washer being provided with an annular series of openings, a nut threaded upon the bolt and provided at one side thereof with a longitudinal opening arranged parallel to the axis of the nut, and also with a transverse opening intersecting the longitudinal opening tangentially and opening through the sides of the nut, a locking plunger slidable within the longitudinal opening of the nut and adapted to be moved into engagement with a selected one of the openings of the washer to lock the nut against rotation, said locking plunger being provided at an intermediate point in its length with spaced grooved portions, and a retaining pin insertible through the transverse opening of the nut and adapted to engage either selected one of the grooved portions of the locking plunger to hold the latter in either a retracted or a projected position.

2. The combination with a bolt having a flat side, a washer fitted slidably upon the bolt and having a flat side for coöperation with the flat side of the bolt to hold the washer against rotation, said washer being provided with an annular series of openings, a nut threaded upon the bolt and provided with a longitudinal opening arranged parallel to the axis of the nut and also with a transverse opening intersecting the said longitudinal opening tangentially and opening through the sides of the nut, a spring actuated plunger slidable within the longitudinal opening of the nut and adapted to be projected into engagement with a selected one of the openings in the washer member to lock the nut against rotation, said plunger being provided at its outer end with a finger piece adapted to be grasped when retracting it, and being also provided with a pair of spaced grooved portions, and a retaining pin insertible in the transverse opening of the nut for engagement with either selected one of the grooved portions of the plunger to hold the plunger in either a projected or a retracted position.

3. The combination of a bolt having a flat side, a washer fitted slidably upon the bolt and having a flat side for coöperation with the flat side of the bolt to hold the washer against rotation thereon, said washer being provided with an annular series of openings, a nut threaded upon the bolt and provided with a longitudinal opening extending parallel to the axis of the nut, and also with a transverse opening intersecting the longitudinal opening tangentially and opening through the sides of the nut, said sides of the nut being provided with short grooves communicating with the ends of the transverse opening and having depressed seats at the sides thereof, a locking plunger slidable within the longitudinal opening and adapted to be projected into engagement with one of the openings of the washer to lock the nut against rotation, said locking plunger having a grooved portion at an intermediate point in the length thereof, and a retaining pin inserted through the transverse opening of the nut for engagement with the grooved portion of the plunger to hold the plunger in operative position, the extremities of the retaining pin extending beyond the sides of the nut and being returned into the before mentioned short grooves, the depressed seats at the sides of the grooves enabling the said returned ends of the retaining pin to be engaged by a tool when it is desired to remove the retaining pin.

4. The combination of a bolt having a flat side, a washer fitted slidably upon the bolt and having a flat side for coöperation with the flat side of the bolt to hold the washer against rotation, said washer being provided with an annular series of openings, a nut threaded upon the bolt and provided with a longitudinal opening arranged parallel to the axis of the nut, and also with a transverse opening intersecting the longitudinal opening tangentially, a depressed seat being formed in the outer face of the nut adjacent the longitudinal opening thereof, a locking plunger slidable through the longitudinal opening of the nut and adapted to be projected into engagement with one of the openings of the washer to lock the nut against rotation, the outer end of the plunger being formed with a side recess which is exposed through the depressed seat of the nut and also with a grooved portion at an intermediate point in the length thereof, and a retaining pin insertible into the transverse opening of the nut for engagement with the grooved portion of the plunger to lock the plunger in operative position, said retaining pin being also adapted to be brought into engagement with the side recess of the plunger for forcibly withdrawing the same when necessary.

5. The combination with a bolt formed with a flat side, a washer fitted slidably upon the bolt and having a flat side for coöperation with the flat side of the bolt, said washer being provided with an annular series of openings, a nut threaded upon the bolt and provided at one side thereof with a longitudinal opening arranged parallel to the axis of the nut, and also with a transverse opening intersecting the longitudinal opening tangentially and opening through the sides of the nut, said sides of the nut being provided with short grooves communicating with the ends of the transverse opening in the nut, a locking plunger slidable within the longitudinal opening of the nut and adapted to be moved into engagement with a selected one of the openings in the washer, and a retaining pin inserted in the transverse opening of the nut for engagement with the locking plunger to hold the latter in position, the ends of the retaining pin extending beyond the sides of the nut to provide finger pieces for inserting and removing the pin, said ends being adapted to be returned into the before mentioned short grooves at the ends of the transverse opening to hold the retaining pin in position, the grooves providing protection for the ends of the retaining pin to prevent the same from being broken off or caught in adjacent objects.

In testimony whereof I have signed my name to this specification in the presence of two subscribing witnesses.

MYRL E. BAILEY.

Witnesses:
E. GORDON JAMES,
ROBERT A. BAILEY.

Copies of this patent may be obtained for five cents each, by addressing the "Commissioner of Patents, Washington, D. C."